Oct. 2, 1928.
L. C. STEELE
1,686,042
ROLLING MILL SCREW DOWN MECHANISM
Filed Feb. 9, 1925    2 Sheets-Sheet 1
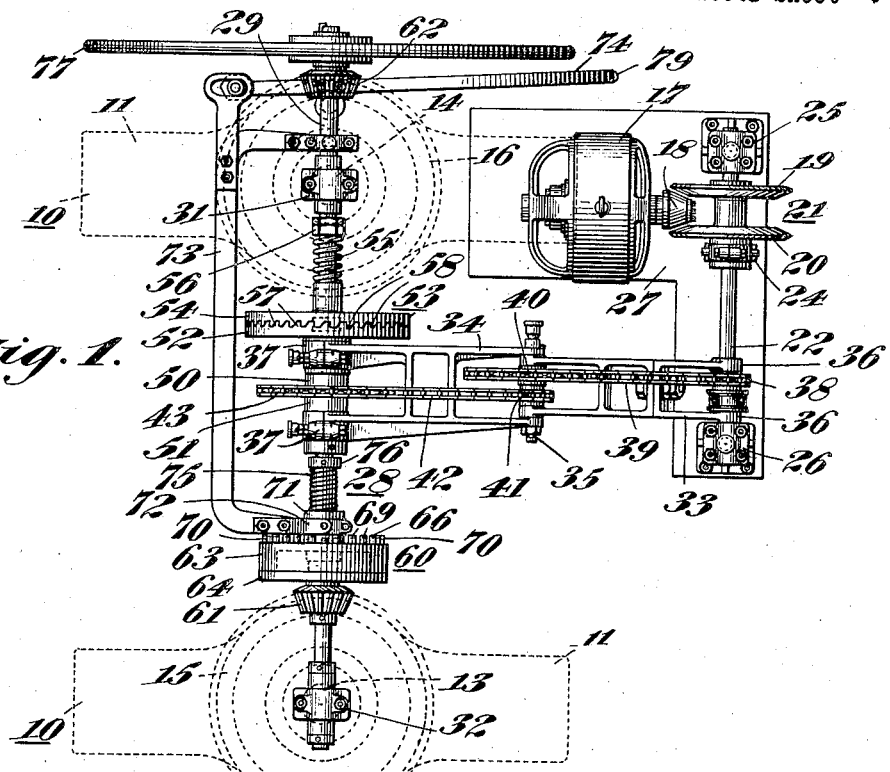
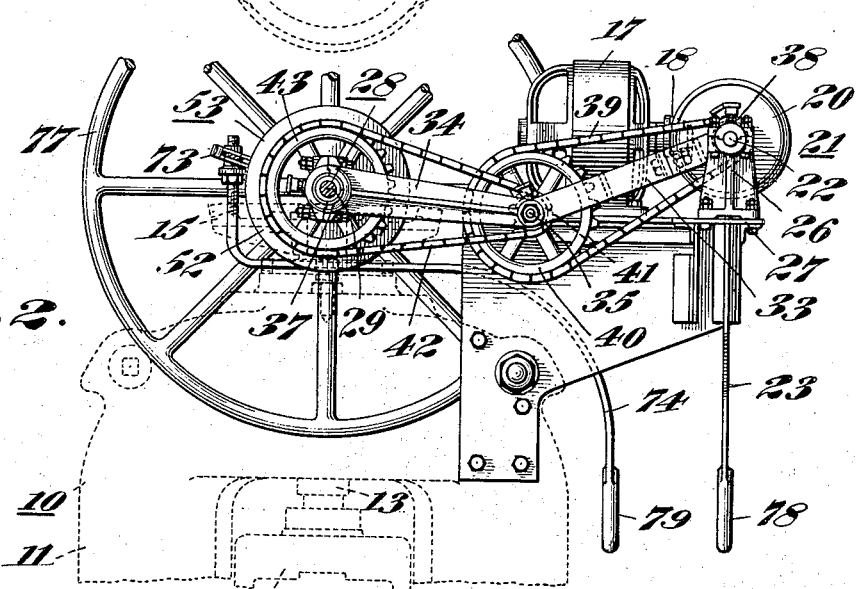
INVENTOR
Lawrence C. Steele.
BY R. S. A. Dougherty
and A. B. Reavis
ATTORNEYS Oct. 2, 1928. 1,686,042
L. C. STEELE
ROLLING MILL SCREW DOWN MECHANISM
Filed Feb. 9, 1925   2 Sheets-Sheet 2
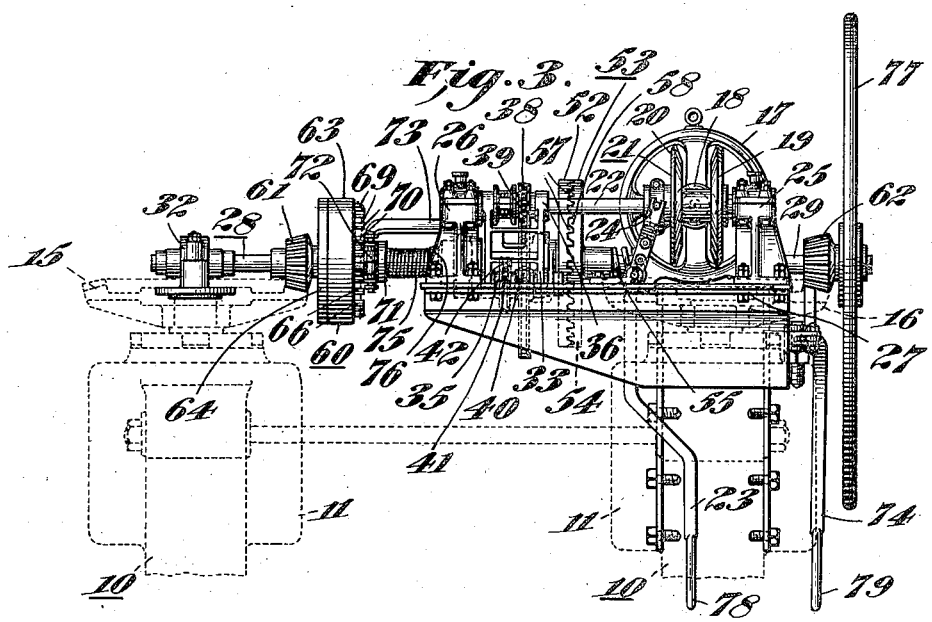
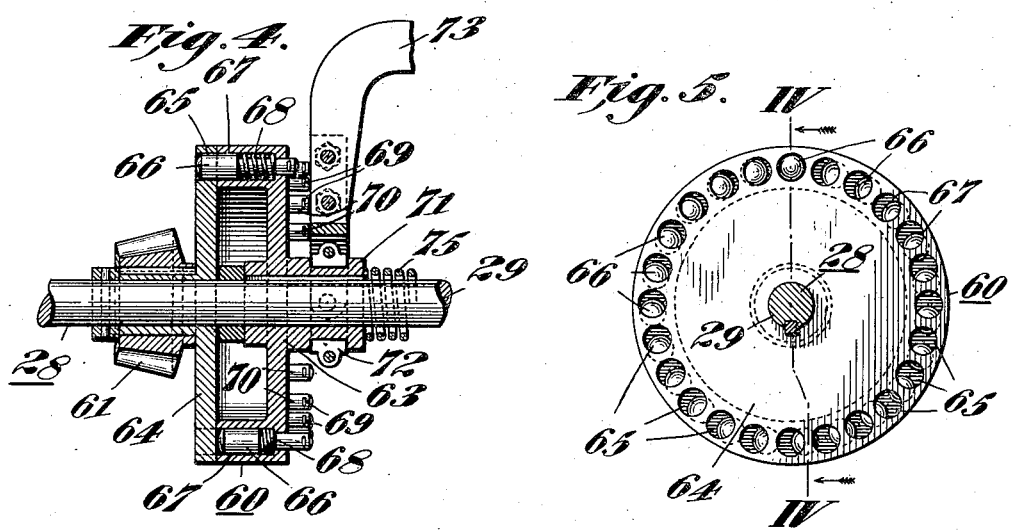
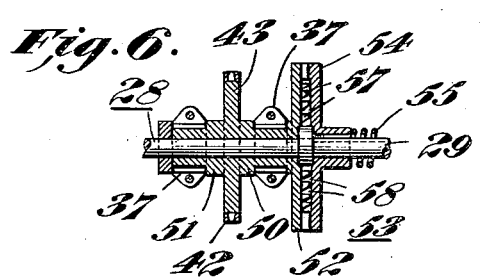
INVENTOR
Lawrence C. Steele.
BY R.S.A. Dougherty
and A.B. Reavis
ATTORNEYS Patented Oct. 2, 1928.

1,686,042

UNITED STATES PATENT OFFICE.

LAWRENCE C. STEELE, OF BALTIMORE, MARYLAND.

ROLLING-MILL SCREW-DOWN MECHANISM.

Application filed February 9, 1925. Serial No. 7,885.

My invention relates to mechanically operated means for adjusting the position of screws in a mill and it has for an object to provide unitary mechanism of this character, whereby not only may the degree of separation of a pair of rolls be very accurately controlled, but also, whereby fine adjustments may be made at any time in order that sheets of more uniform gage may be rolled.

A further object of my invention is to provide a pair of adjusting screws in a mill with gears which are operated by driving gears, the driving gears being connected by means of a clutch in order that the angular position of one driving gear with respect to the other driving gear may at any time be varied and one of the driving gears being driven when required by means of a continuously operating motor, the transmission means between the motor and the driving gears including reversible and releasable frictional gearing, whereby, not only may the extent of motion imparted to the driving gears be accurately controlled, but also the angular motion of the driving gears may be at a suitably low rate to permit of a very accurate adjustment of the screws.

A further object of my invention is to provide motor operated mechanism for adjusting the position of screws in a mill which includes a vernier clutch in order that the angular position of one screw may be changed with respect to the other screw and reversible and disconnectible gearing in order that motion from the continuously operated motor may be applied in either one direction or the other together with manually controlled means for the clutch and for the reversible gearing which include manual elements available for operation from a common position.

A further object of my invention is to provide a motor operated mechanism for adjusting the position of screws for limiting upward motion of an upper roll in a mill which includes a continuously operating motor driving the driving element of a yieldable clutch through reversible frictional gearing, the driven element of the yieldable clutch being connected to a shafting device which has driving gears thereon meshing with gears connected to the screws and the shafting device including a clutch in order that one driving gear may be adjusted angularly with respect to the other driving gear for the purpose of securing a change in relative position of the screws, the reversible frictional gearing and the clutch being controlled by separate means, each of which includes a manual operating element and the manual operating elements being disposed close together so that they may be operated from a common position.

A further object of my invention is to provide, in connection with apparatus of the character referred to, a vernier clutch which is of such a type as to permit of very fine relative adjustments of the screws which determine the upward extent of movement of an upper roll in a mill, whereby it is possible to secure a very accurate adjustment of rolls and consequent extreme uniformity in gage of sheets rolled.

My invention finds particular utility in connection with my improved automatic tin mill disclosed and claimed in my application Serial No. 554,573 filed April 18, 1922. The various levers of the operating mechanism of the present invention are brought to an operating position such that the operator may control other elements of the automatic mill as well as this mechanism for controlling the elevation of the upper roll of the mill. The present invention, therefore, contributes to the general objective of making a mill unit of this character as automatic as possible in order to increase production and to decrease labor.

Apparatus made in accordance with my invention is illustrated in the accompanying drawings, forming a part of this application, in which—

Fig. 1 is a plan view of my improved mechanically operated screw adjusting mechanism;

Fig. 2 is a side elevation of the apparatus shown in Fig. 1;

Fig. 3 is an end elevation of the apparatus shown in Fig. 1;

Fig. 4 is a longitudinal sectional view of my improved vernier clutch taken along the lines IV—IV of Fig. 5;

Fig. 5 is a detail view showing one of the clutch elements in elevation and cooperating clutching device; and Fig. 6 is a sectional view of a detail.

Referring now to the drawings for a better understanding of my invention, I show a mill, at 10, which may be of a type commonly used as hot mills in tin mills. Such a mill ordinarily includes a stand or frame such as indicated at 11, forming guides for shoes which support the bearings fitted below the trunnions of the lower roll and above the trunnions of the upper roll. In a mill of this character, the lower roll is usually driven from the source of power and screws cooperate with the shoes above the bearings of the upper roll in order to limit upward motion of the latter roll due to passage of metal between the rolls. I show shoes, 12, whose upper positions are determined by vertical screws 13 and 14. Bevel gears 15 and 16 are secured to the screws 13 and 14, respectively. The apparatus so far described is old and well known in the art and only a brief description and diagrammatic illustration thereof is necessary in so far as my invention is concerned. The bevel gears 15 and 16 carried by the screws and which are related to the latter in a way well known in the art are operated by my novel type of mechanical controlling mechanism, and the latter apparatus will now be described.

The controlling mechanism for adjusting the screws 13 and 14 comprises a motor, 17, of any suitable type and which is preferably operated continuously while the mill is in operation. The motor 17 has connected to its driving shaft a bevel driving frictional pinion 18, which may engage with either of the bevel frictional gear elements 19 or 20 carried by the driven frictional gear device, at 21. The driven frictional gear device, at 21, is splined to an intermediate shaft 22 and it is adapted to be moved therealong by a lever 23, which has a yoke 24 for engagement with one end of the driven frictional gear device. The shaft 22 is mounted in bearings 25 and 26 carried by the supporting structure 27 which also supports the motor 17.

Motion from the shaft 22 in either direction is transmitted to a cross shaft device, indicated generally at 28, and which includes a shaft 29 journalled in bearings 31 and 32 swivelled to the upper ends of the screws 14 and 13, respectively. The shafting device, at 28, therefore, moves upwardly and downwardly with the screws and the gearing for transmitting motion from the shaft 22 thereto should be capable of allowing this movement of the shafting device, at 28. To this end, I show two frames 33 and 34 hinged together by a shaft 35, the frame 33 having bearings 36 fitting the shaft 22 and the frame 34 having bearings 37 coaxial with respect to the shaft 29. A sprocket 38 is fixed to the shaft 22 between the bearings 36 and drives a sprocket chain 39, which engages the sprocket wheel portion 40 of a double idler sprocket freely mounted on the shaft 35. The other sprocket wheel portion 41 of the double idler sprocket drives a sprocket chain 42 which engages the driving sprocket wheel 43 for the shafting device, at 28. From the structure described, it will be apparent the wheel 43 and the shaft 29 may, move up or down without disturbing the driving relation between the shaft 22 and that wheel.

Since the shafting device, at 28, is motor operated, it is desirable to include in the operating mechanism some form of yieldable clutch in order to safeguard the apparatus against breakage, particularly when the screws come into abutting relation with respect to the shoes 12. Accordingly, therefore, I show the driving sprocket wheel 43 provided with hub extensions 50 and 51, these hub extensions fitting in bearing relation on the shaft 29 and preferably being interposed between that shaft and the bearings 37 of the frame 34.

The hub extension 50 extends beyond its bearing and it is connected to the driving element 52 of a yieldable clutch, at 53. The yieldable clutch includes a driven element 54 which is splined to the shaft section 29 and which is maintained pressed against the driving clutch element 52 by means of a spring 55 maintained in compression between the driven clutch element 54 and a nut 56 adjustably mounted on the shaft section 29.

The driving and driven clutch elements 52 and 54 are connected by meshing inclined teeth 57 and 58, respectively; and the inclination is in such a direction, looking at the top of Fig. 1, that an overload on the yieldable clutch, when the screws 13 and 14 are being moved down, will result in the teeth 57 of the driving clutch element 52 exerting a large component of applied force in an axial direction to the driven clutch element 54. When that component of force exceeds the force of the spring 55, the driven clutch element 54 will be pressed back sufficiently far for the teeth 57 and 58 to clear each other, thereby permitting of the driving clutch element 52 to run ahead in case of overload when the mechanism is operated to lower the screws 13 and 14.

In order that the screws 13 and 14 may be relatively adjusted with respect to each other, I show a vernier clutch device, at 60, carried by the cross shaft 29 and which is arranged to permit of angular adjustment between the pinion 61, meshing with the bevel gear 15, and the pinion 62, keyed to the shaft 29 and meshing with the bevelled gear 16. Referring to Fig. 4, it will be seen that the vernier clutch, at 60, comprises a driving element 63, which is splined to and axially movable with respect to the cross shaft 29. This clutch also includes a driven clutch element 64, which is rotatably mounted with respect to the shaft 29 and which is positively connected to the pinion 61. By disengaging the clutch, at 60, the shaft 29 and the bevel gear 62 carried thereby may be rotated to operate the screw 14 independently of the screw 13. By rendering the motor operated mechanism effective, it is, therefore, possible to secure any suitable degree of angular adjustment between the pinions 62 and 61.

As may be seen from Figs. 4 and 5, I show the vernier clutch, at 60, as being comprised by the driven element 64 in the form of a disk having a circumferential series of openings 65. The driving clutch element 63 has a circumferential series of pins 66 which are axially movable and which are disposed at the same radial distance from the axis of the shaft 29 as the openings 65 are. The number of openings 65 differs from the number of pins 66 in order to secure a vernier adjustment. For example, I show one more opening 65 than there are pins 66. Each of the pins 66 is mounted in a socket 67 and a spring 68 is arranged in the socket for moving the pin forwardly to engage an opening 65. Forward motion of the pins 67 is limited by cotters 69 passing through the stems 70 of the pins.

To disengage the driving clutch element 63 from the driven clutch element 64, it is necessary that the driving clutch element be retracted sufficiently so that a pin 67 in its forward position may be entirely disengaged from an opening 65. To this end, I show the driving clutch element 63 provided with a rearwardly extending hub 71 which is engaged by a yoke 72 connected to the actuating link 73, which, in turn, is operated by the manually controlled lever 74. The driving clutch element 63 is pressed in an engaging direction by a helical spring 75 arranged under compression about the shaft 29 and which abuts with one end of the hub 71 and with a collar 76 connected to the shaft 29.

The shaft 29 may also be operated, independently of the motor operated driving mechanism just referred to, by a hand wheel 77 keyed to one end thereof.

The levers 23 and 74 are so designed that the hand operated elements 78 and 79 thereof may be so placed as to be capable of operation by an operator from a common operating position.

The operation of the apparatus described will be apparent. The motor 17 is operated continuously with the operation of the mill and the screws 13 and 14 may be raised or lowered as required by manipulating the frictional gearing to secure turning of the screws in one direction or the other. In case of either screw coming in contact with a shoe 12, thereby limiting further downward movement of that screw, the yieldable clutch at 53 comes into play to permit the power operated driving mechanism to run ahead of the cross shaft 29.

Whenever it is necessary to secure a relative adjustment of the screws 13 and 14 in order to secure a greater uniformity in gage of material rolled, it is merely necessary to elevate the screws 13 and 14, to disconnect the vernier clutch, at 60, and to elevate the screw 14 to a higher position than the screw 13. The vernier clutch is then connected and both screws are simultaneously lowered until the screw 13 comes in contact with its shoe 12. After the clutch, at 60, is disconnected and the screw 14 is operated until it comes in contact with its shoe 12. When both screws are contacted in this way, the vernier clutch, at 60, is permitted to reengage.

The clutch, at 60, permits of such fine angular adjustment of the bevel pinion 61 with respect to the bevel pinion 62 that the screws 13 and 14 may be so adjusted that rolling may be effected with a high degree of uniformity of gage throughout the sheets rolled. For example, it is possible to roll a sheet, by employing my improved adjusting and controlling mechanism, with a difference of only .001" in thickness from end to end of the rolls.

My invention has the advantage of bringing the control of the adjustment of the screws upwardly and downwardly as well as the relative adjustment of such screws for correction within a convenient position for operation so that a single operator may look after the mill and secure proper control of the screws by manipulation of the levers 23 and 74 as aforesaid.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described the invention, what I claim as new and desire to secure by Letters Patent is:—

1. The combination, with a mill having screws for limiting upward movement of an upper roll, gears connected to the screws, bearings movable with the screws, a cross shaft carried by the bearings, driving gears on the cross shaft and meshing with the first gears, one of the driving gears being secured to the cross shaft and the other being loose thereon, a vernier clutch between the shaft and the loose driving gear, a continuously operating motor, a transmission mechanism between the motor and the shaft including reversible and disconnectible gearing, means for engaging and disengaging the clutch, and means for rendering the reversible gearing effective for driving the shaft in either direction or ineffective, both of said controlling means including manual elements available for operation from a common position.

2. The combination, with a mill having screws for limiting upward movement of an upper roll, of gears secured to the upper ends of the screws, bearings movable with the screws and disposed above the gears, a shaft carried by the bearings, driving gears on the shaft and meshing with the first gears, one of the driving gears being keyed to the shaft and the other being loose thereon, a vernier clutch between the shaft and the loose driving gear, a continuously operated motor, a yieldable clutch including driving and driven elements and the driven element being connected to the shaft, a transmission mechanism between the motor and the driving element of the yieldable clutch and including reversible and disconnectible gearing, means for engaging and disengaging the vernier clutch, and means for rendering the reversible gearing effective for driving the shaft in either direction or ineffective.

3. The combination, with a mill having screws for limiting upward movement of an upper roll, of bevel gears secured to the upper ends of the screws, bearings movable with the screws and disposed above the bevel gears, a shaft carried by the bearings, bevel driving pinions carried by the shaft and meshing with the bevel gears, one of the pinions being keyed to the shaft and the other being loose thereon, a vernier clutch between the shaft and the loose pinion, a continuously operating motor, a friction pinion driven by the motor, a driven frictional gear device including frictional gear elements disposed at opposite sides of the friction pinion, means for moving the driven frictional gear device to engage either of its elements with the pinion or to disengage said elements from the pinion, means for transmitting motion from the driven frictional gear device to the shaft, and means for engaging and disengaging the vernier clutch.

4. The combination, with a mill having screws for limiting upward motion of an upper roll, of gears secured to the screws, bearings movable with the screws, a shaft carried by the bearings, driving gears carried by the shaft and meshing with the first gears, one of the driving gears being connected to the shaft and the other being loose thereon, a vernier clutch between the shaft and the loose driving gear, means for engaging and for disengaging the vernier clutch, a continuously operating motor, a friction pinion driven by the motor, an axially movable frictional gear device including frictional gear elements at opposite sides of the frictional pinion, means for moving the frictional gear device to engage either of its elements with the pinion or to disengage said elements therefrom, a yieldable clutch including driving and driven elements and the driven element being positively connected to the shaft, and means for transmitting motion from the driven frictional gear device to the driving element of said yieldable clutch, the controlling elements for the vernier clutch and for the driven frictional gear device having manual elements available from a common operating position.

5. The combination, with a mill having screws for limiting upward motion of an upper roll, of gears secured to the screws, bearings movable with the screws, a shafting device journalled in the bearings, gears carried by the shafting device and meshing with the first gears, a motor, a rotatable shaft, reversible and disconnectible frictional gearing between the motor and the rotatable shaft, a non-rotatable shaft, a gear device rotatable on the non-rotatable shaft, a driving gear carried by the shafting device, a frame having lateral arms, bearings carried by the arms at one end of the frame and disposed at opposite sides of the driving gear and in supporting bearing relation with respect to the shafting device, bearings carried by the arms at the other end of the frame and journalled on said non-rotatable shaft at opposite sides of the gear device, means for transmitting motion from the reversible frictional gearing to the gear device, and means for transmitting motion from the gear device to the driving gear on the shafting device.

6. The combination, with a mill having screws for limiting upward motion of an upper roll, gears secured to the screws, bearings movable with the screws, a shaft journalled in the bearings, driving gears carried by the shaft and meshing with the first gears, one of the driving gears being connected to the shaft and the other being loose thereon, a connectible and disconnectible clutch between the shaft and the loose gear for adjusting the angular relation between the driving gears, means for controlling the clutch, a yieldable clutch including driving and driven elements and the driven element being positively connected to one of the shaft sections, a driving gear connected to the driving element of the yieldable clutch, a continuously operating motor, an intermediate shaft disposed at right angles to the axis of the motor, a bevel frictional pinion carried by the motor shaft, a frictional gear device splined to the intermediate shaft and including bevel frictional gear elements disposed at opposite sides of the bevel pinion, means for moving the frictional gear device to engage either of its bevel frictional elements with said bevel pinion or to disengage said elements therefrom, a frame having arms disposed at opposite sides of said driving gear, bearings carried by said arms and disposed in bearing relation with respect to the shaft and to the driving gear, means for pivotally supporting the other end of the frame, a gear device movable about the axis of the pivotal support, means for transmitting motion from the intermediate shaft to said gear device, and means for transmitting motion from the gear device to the driving gear.

7. In a rolling mill, the combination of a pair of abutment screws, a driving member operatively connected to one of said abutment screws, a vernier coupling having a pair of members adapted to be coupled, means to move one of said members relatively to the other of said members whereby the coupling or uncoupling of said members is effected, one of the coupling members being connected to the driving member, and means operatively connecting the other coupling member to said other abutment screw.

8. In a rolling mill, the combination of a pair of abutment members adapted to limit the opening between the rolls, a driving member, means for connecting the driving members to one of said abutment members to transmit motion from the driving member to such abutment member, a vernier coupling having a pair of members adapted to be coupled, means to move one of said members relatively to the other of said members whereby the coupling or uncoupling of said members is effected, one of the coupling members being connected to the driving member, and means for connecting the other coupling member to the second abutment member to transmit the motion of the coupling member to the abutment member.

9. A mechanism comprising a pair of parallel rod members, a driving member, means for connecting the driving member to one of the rod members for converting motion of the rod member, a coupling having a pair of members adapted to be coupled, one of the coupling members carrying a series of pins, the other of said coupling members having a series of holes receptive of said pins, means for urging the pins into said holes, a driving connection between the driving member and one of the coupling members, and means connecting the other coupling member to the rod member for converting the motion of the coupling member into longitudinal motion of said other rod member.

10. In a rolling mill, the combination with a housing, a pair of rolls journalled in said housing, a pair of abutment members mounted in said housing adapted to limit the opening between said rolls, a driving member mounted on the housing, a motor adapted to rotate said driving member, an emergency clutch interposed between the motor and said driving member, adapted to disengage when an excessive load is imposed upon the mechanism, a motion transmitting means between the driving member and one of the abutment members for imparting movement to the latter upon movement to the driving member, a vernier coupling including a pair of coupling members adapted to be coupled and yieldably held in justaposition with each other, a series of spring pressed pins carried by one of the coupling members and adapted to engage holes formed in the other coupling member, one of said coupling members being splined to said driving member, means connecting the other coupling to the other abutment member for imparting movement to the latter upon movement of said other clutch member, and means to move the coupling members apart to disengage the coupling.

11. In a mill, the combination with screws for limiting the upward motion of an upper roll, of gears carried by the screws, a cross shaft supported in bearings carried by the screws, pinions on the shaft and engaging the gears, means for connecting the pinions to the cross-shaft, a continuously operating motor, a shaft driven from the motor, link mechanism comprising two members connected by a pivot shaft and the respective members having their outer ends supported in bearing relation by the cross shaft and by the motor-driven shaft, an idler sprocket member having two sprocket wheel portions freely mounted on the pivot shaft, sprocket wheels carried by the motor-driven shaft and by the cross shaft, a sprocket chain engaging about the motor-driven shaft sprocket wheel and one of the sprocket wheel portions of the idler sprocket member, and a second sprocket chain engaging the other sprocket wheel portion of the idler sprocket member and the sprocket wheel on the cross shaft.

12. In a mill, the combination, with screws for limiting the upward movement of an upper roll, of means for raising and lowering the screws comprising a cross shaft movable with the screws, a motor, a shaft driven by the motor, and extensible and contractible transmission mechanism angularly movable with respect to the motor-driven shaft for transmitting motion from the latter to the cross shaft.

In testimony whereof I hereunto affix my signature this 28th day of January, 1925.

LAWRENCE C. STEELE.